United States Patent [19]

Derrien

[11] Patent Number: 5,360,185
[45] Date of Patent: Nov. 1, 1994

[54] LINEAR ACTUATOR, IN PARTICULAR FOR DRIVING AN AIRCRAFT LANDING GEAR LEG

[75] Inventor: Michel Derrien, Versailles, France

[73] Assignee: Messier-Bugatti, Velizy Villacoublay, France

[21] Appl. No.: 11,780

[22] Filed: Feb. 1, 1993

[30] Foreign Application Priority Data

Feb. 3, 1992 [FR] France ................. 92 01162

[51] Int. Cl.⁵ ............................................. B64C 25/18
[52] U.S. Cl. ........................... 244/102 R; 74/424.8 R; 192/76; 192/93 C
[58] Field of Search ........... 244/75 R, 102 R, 102 SL; 74/424.8 R, 424.8 NA; 192/76, 93 C

[56] References Cited

U.S. PATENT DOCUMENTS

| | | | |
|---|---|---|---|
| 2,611,464 | 9/1952 | Rabe | 192/93 C |
| 2,828,845 | 4/1958 | Thornton | 244/75 R |
| 2,843,237 | 7/1958 | Carr | 192/93 C |
| 3,066,777 | 12/1962 | Hoffman | 192/93 C |
| 3,572,163 | 3/1971 | Clark | 192/93 C |
| 4,067,425 | 1/1978 | Soter | 192/76 |
| 4,794,810 | 1/1989 | Parsons | 74/424.8 R |
| 4,920,816 | 5/1990 | Inabe et al. | 74/424.8 R |
| 5,028,828 | 7/1991 | Felkai et al. | 244/75 R |

FOREIGN PATENT DOCUMENTS

| | | |
|---|---|---|
| 0310570 | 8/1988 | European Pat. Off. |
| 894049 | 3/1944 | France |
| 1017494 | 2/1950 | France |

Primary Examiner—Galen L. Barefoot
Attorney, Agent, or Firm—Sixbey, Friedman, Leedom & Ferguson

[57] ABSTRACT

A linear actuator, in particular for driving an aircraft landing gear leg, the actuator comprising a main body with a screw that is prevented from moving axially and that is constrained to rotate with a coaxial gear wheel that meshes with the outlet gear wheel of a driving motor and gear box assembly, and a nut that is secured to a sliding guide rod inside said main body. According to the invention, the rotary connection between the screw and the coaxial gear wheel is provided by declutchable coupling means, which means is declutched in an emergency for the purpose of releasing the screw by associated trigger means whose operation requires very little energy.

6 Claims, 1 Drawing Sheet

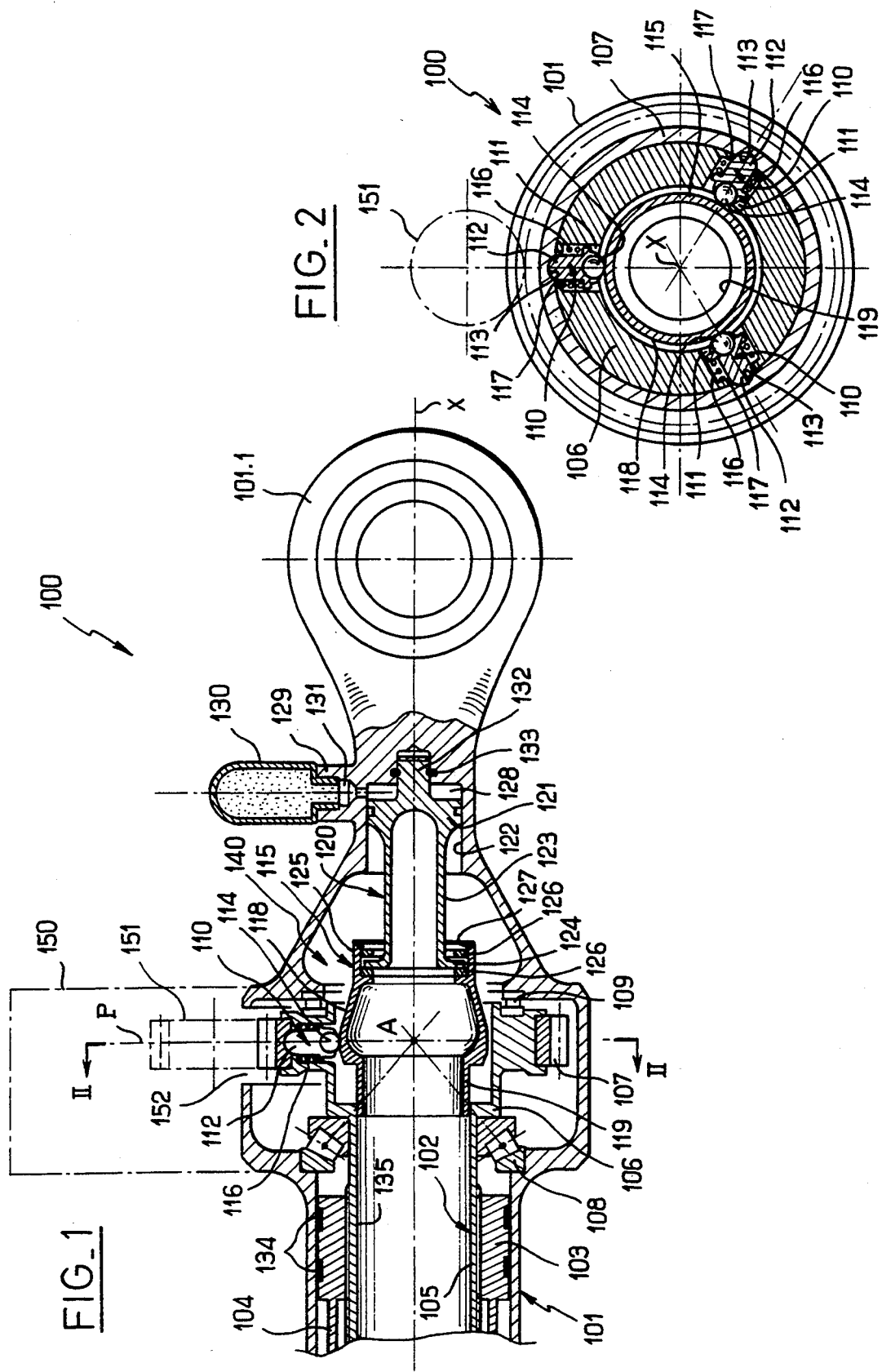

5,360,185

LINEAR ACTUATOR, IN PARTICULAR FOR DRIVING AN AIRCRAFT LANDING GEAR LEG

The invention relates to linear actuators, in particular electromechanical actuators using a screw and nut system.

BACKGROUND OF THE INVENTION

In aviation, such actuators are used at present for flight controls, and they can have non-negligible advantages over hydraulic actuators.

When centralized electricity generation is provided, the advantage of such actuators can be seen even more clearly, particularly if it is desired to use them for driving landing gear legs.

The driving element of the screw and nut system may be the screw or the nut, however it is often preferred for the system to have the screw as the driving element and the nut as the driven element, with the screw being prevented from moving axially and being constrained to rotate by means of a coaxial gear wheel that meshes with the outlet gear wheel of a motor and gear box assembly, while the nut is secured to a guide rod and sliding in the main body. Such a solution provides good protection against shock and against external pollution (because of the guide rod), better stability against buckling in the extended position (because the guide rod is guided in the main body), and better capacity for greasing the screw. Furthermore, the installation of anti-rotation systems for the guide rod and for its end-of-stroke abutments is facilitated: as a result, in particular when driving an aircraft landing gear leg, the above-described configuration appears to be more suitable than the opposite configuration.

Nevertheless, that type of linear actuator suffers from drawbacks that may be severe if a major mechanical failure should occur (a tooth breaking, seizing where the teeth engage and/or in the bearings): this is most particularly the case when the actuator is associated with driving an aircraft landing gear leg, since a fault of the above type can cause the screw of the screw-and-nut system to jam before the landing gear has been lowered or while it is being lowered, and the inertia of the landing gear and the aerodynamic effects exerted thereon can then insufficient to unjam the actuator.

Although the probability of such a fault is low (in aviation, it is always desirable to achieve a failure rate of less than $10^{-9}$ per hour), the consequences that stem therefrom are nevertheless very severe.

That is precisely the problem which the invention seeks to resolve, even though its field of application is not strictly limited to that of actuators for driving landing gear legs.

OBJECTS AND SUMMARY OF THE INVENTION

An object of the invention is thus to provide a linear actuator whose structure makes it possible to cope with a situation where teeth break or where meshing sets of teeth seize and/or where bearings seize.

Another object of the invention is to provide a linear actuator whose structure is both lightweight and compact, thus making the actuator particularly advantageous for driving a landing gear leg, with lowering of the landing gear then being given priority over anything else (it is of little importance if the system should need more difficult re-engagement operations to be performed on the ground after emergency use, since the essential purpose will have been achieved if the aircraft is enabled to land normally).

More particularly, the present invention provides a linear actuator, in particular for driving an aircraft landing gear leg, the actuator comprising a main body with a screw that is prevented from moving axially and that is constrained to rotate with a coaxial gear wheel that meshes with the outlet gear wheel of a driving motor and gear box assembly, and a nut that is secured to a sliding guide rod inside said main body, wherein the rotary connection between the screw and the coaxial gear wheel is provided by declutchable coupling means, which means is declutched in an emergency for the purpose of releasing the screw by associated trigger means whose operation requires very little energy.

Preferably, the coupling means is essentially constituted by at least one radial finger carried by an extension of the screw on which the coaxial gear wheel is mounted to rotate, said radial finger having its radially inner end bearing against an associated cam and having its radially outer end co-operating with an associated recess in the coaxial gear wheel, said cam being axially displaceable between a coupled position and a decoupled position by triggering the trigger means. It is then advantageous for the coupling means to include a plurality of radial fingers angularly distributed around the axis of the screw, each of said radial fingers being urged by an associated spring against a common cam which is generally conical in shape and which is disposed coaxially with said screw.

More accurate operation can be obtained by providing for the radially inner end of the (for each) radial finger to be constituted by a ball assembled thereto, and for the common cam to include an axial extension suitable for sliding telescopically in the screw.

In a preferred embodiment, the trigger means comprise a gas cartridge and a piston slidable in a blind bore of the main body and having a free end coupled to the associated cam in such a manner that triggering said trigger means causes axial displacement of said piston and of said cam under drive from gas released by said cartridge.

In particular, the cartridge may contain a powder that releases the propellant gas when ignited by explosive means, or in a variant it may be a store of gas from which the propellant gas is released via an associated valve or cock.

It is also advantageous for the screw to bear against the main body via a swivel bearing. This makes it possible to impart displacement flexibility to the screw that is highly advantageous.

It is then advantageous for the swivel bearing to be disposed in such a manner that the reaction associated therewith converges conically towards the axis of the screw at a point on said axis that lies in the radial plane of symmetry of the coaxial gear wheel, or that is at least situated in the vicinity of said plane. It is thus possible to avoid setting up interfering friction forces because the tangential forces are taken up better by this organization of the swivel bearing (ball or roller).

BRIEF DESCRIPTION OF THE DRAWING

Other characteristics and advantages of the invention appear more clearly in the light of the following description and the accompanying drawing relating to a particular embodiment, in which:

FIG. 1 is an axial section through a linear actuator of the invention (the view shows only the relevant portion of said actuator, i.e. its end associated with drive from the motor and gear box unit, which unit is represented merely by its last or outlet gear wheel, the other end of the actuator being conventional); and FIG. 2 is a section on II-II of FIG. 1, showing more clearly how the radial coupling fingers are disposed (in this case three fingers at 120°).

MORE DETAILED DESCRIPTION

FIGS. 1 and 2 show a linear actuator 100 of the invention whose structure is particularly well adapted to use for the purpose of driving an aircraft landing gear leg. The actuator 100 comprises an essentially cylindrical main body 101 including a link portion 101.1 which is used in the context of the above-specified application for connecting the actuator to the structure of an airplane. A screw and nut system is received in the main body 101 with a screw 102 that is prevented from moving axially and that is rotated about its axis X, and with a nut 103 that is secured to a guide rod 104 slidably mounted in the main body 101. The other end of the linear actuator 100 (not shown) includes a link portion analogous to the portion 101.1 for connection to the landing gear leg. The main body 101 thus acts as a housing tube which guides and protects the guide rod 104. Thus, when the screw 102 is rotated, the nut 103 and the guide rod 104 that is secured thereto slide axially without rotating along the axis X. The drive means are constituted in this case by a motor and gear box assembly 150, comprising for example an electric motor and a gear box having several stepdown stages, with the gear box being represented merely by its last or outlet gear wheel 150 which meshes with a gear wheel 107 disposed coaxially with the screw 102. The motor and gear box assembly 150 thus enables the screw 102 to be rotated about the axis X, and thus causes the nut 103 to move axially, which nut is held between the outwardly threaded central portion 105 of the screw 102 and the bore of the main body 101, said nut being provided in this case with sealing and guiding rings 134.

In accordance with an essential aspect of the invention, the rotary connection between the screw 102 and the coaxial gear wheel 107 is provided by means of a coupling 140 which is capable of being declutched, with declutching being performed in an emergency for the purpose of releasing the screw 102 by using associated trigger means 120, 130 which require very little energy for triggering purposes.

Because of such a declutchable connection, it is possible to release the screw 102 if a major mechanical fault should occur (a tooth breaking, seizing between the meshing teeth and/or in the bearings), thereby imparting highly advantageous additional safety. When the linear actuator 100 is used for driving an aircraft landing gear leg, the release of the screw which is easily triggered in the last resort by the pilot, enables the landing gear to be lowered under inertia and the associated aerodynamic forces, thereby enabling the aircraft to land normally.

In the embodiment shown, the coupling means 140 is essentially constituted by at least one radial finger 110 (three radial fingers disposed at 120° in this case) carried by an extension 106 of the screw 102 on which the coaxial gear wheel 107 is rotatably mounted. Thus, in this case, the extension 106 includes a plurality of radial housings 111 each serving to receive an associated radial coupling finger 110. Each radial finger 110 has its radially inner end 114 bearing against an associated cam 115, and in the coupled position it co-operates via its radially outer end 112 with an associated recess 113 in the coaxial gear wheel 117. As shown, each radial finger 110 is in the form of a pin whose radially outer end 112 passes through an associated radial opening 117 in the peripheral bearing-forming portion of the extension 106. The inside surface of the ring constituted by the gear wheel 107 has three recesses 113 at 120° intervals in this example, each having a cup shape that is complementary to the end shape of the radial fingers 110. Each of the fingers 110 is urged by an associated spring 116 against the cam 115, which in this case is constituted by a single cam common to all three radial fingers 110. Having a common cam considerably simplifies the structure of the actuator and ensures that the motion of the various radial fingers is accurately synchronized. The common cam 115 is generally conical in shape, and it is disposed coaxially with the screw 102. This common cam is axially displaceable between a coupled position and a decoupled position by triggering the trigger means 120, 130 in a manner described in greater detail below when describing the members constituting said trigger means.

The common cam 115 has a main portion 118 that is substantially conical in shape and that is contacted by the radially inner ends of the radial fingers 110, which ends are constituted in the present case by respective balls 114 assembled to the fingers. The position shown corresponds to a coupled position in which the radial fingers 110 provide a driving connection in rotation between the coaxial gear wheel 107 and the screw 102. In this situation, the operation of the linear actuator is that of a conventional actuator. The last gear wheel 151 of the motor and gear box assembly 150 passes through an associated lateral opening 152 in the main body 101 without requiring any kind of modification over the body of a conventional type of actuator. However, if a fault occurs that is sufficiently serious to jam the screw 102 and prevent it from rotating, then all the pilot needs to do is trigger a short stroke axial displacement of the common cam 115 (to the left in FIG. 1) so that all of the radial fingers 110 retract synchronously, thereby releasing the coupling between the screw 102 and the coaxial gear wheel 107. The screw 102 is then free to rotate relative to the gear wheel 107 and to all of the gear wheels upstream therefrom within the gear box assembly.

As can be seen in FIG. 1, the common cam 115 also includes a cylindrical extension 119 whose outside diameter corresponds substantially to the inside diameter of the bore 135 of the main portion 105 of the screw, in such a manner as to enable said cylindrical extension to slide telescopically in the screw 102. This ensures that the common cam 115 is properly guided axially, and consequently ensures that the radial fingers 110 retract synchronously.

In a particularly advantageous embodiment, the trigger means for declutching the rotary connection between the screw 102 and the coaxial gear wheel 107 includes a gas cartridge 130 and a piston 120 which is coupled to the common cam 115 in such a manner that triggering such trigger means causes said piston to move axially together with said cam under drive from the gas released from the cartridge. The main body 101 thus includes a lateral appendix 129 into which the gas cartridge 130 is screwed, and having a central passage 131 providing communication with a blind bore 122 of the main body in which the main portion 121 of the piston 120 slides. The propellant gas can thus penetrate very quickly via the passage 131 to reach the chamber 128 behind the piston 120 and thus achieve almost instantaneous displacement of said piston. The piston 120 also includes a rear guide end 132 which is temporarily supported by an associated ring 133, and a front extension 123 which is terminated by an enlargement 124 that provides coupling with the common cam 115, or more precisely with a cylindrical end portion 125 thereof, said enlarged portion thus being held axially between two associated rings 126 which are held in place by a spring clip 127. Thus, when the propellant gas is released, the axial displacement of the piston 120 (to the left in FIG. 1) causes the common cam 115 to be displaced instantaneously so the cylindrical end 119 thereof slides telescopically into the screw 102, thereby causing all of the radial fingers 110 to be retracted simultaneously, and consequently declutching the rotary driving connection between said screw and the coaxial gear wheel 107.

The gas cartridge 130 may be constituted by a cartridge containing a powder that releases the propellant gas when ignited by explosive means. In a variant, the cartridge 130 could be a supply of gas with the propellant gas being released via an associated valve or cock. Triggering may be achieved by any appropriate means providing said triggering requires very little energy: it is preferably constituted by explosive type trigger means controlled by the pilot from the cockpit.

In addition, as can be seen more clearly in FIG. 1, the screw 102 bears via a roller swivel bearing 108 against the main body 101 level with the extension 106 of said screw. Such a swivel bearing provides the screw 102 with displacement flexibility. The swivel bearing 108 is then preferably disposed in such a manner that the reaction associated therewith converges conically onto the axis X of the screw 102 at a point A on said axis (see FIG. 1) which lies in the radial plane of symmetry P of the coaxial gear wheel 107, or is at least situated close to said plane. By improving the way tangential forces are taken up, this disposition of the swivel bearing 108 serves to avoid interfering friction forces being created. The other side of the coaxial gear wheel 107, i.e. at the terminal end of the extension 106, has an axial abutment 109 of conventional type with operating clearance so as to avoid interfering with the displacement flexibility provided by the swivel bearing 108.

A linear actuator is thus implemented whose structure makes it possible to cope with a situation in which teeth break or in which bearings and/or sets of teeth seize, which structure is both light in weight and compact. The coupling means implemented as a plurality of radial fingers is much lighter and much more compact than a claw type clutch system. Known claw type clutches would doubtless provide a system that is easier to reset, but would give rise to considerable bulk and weight during normal operation of the linear actuator. In this particular application, the structure of the linear actuator serves above all to facilitate lowering the landing gear, even if resetting operations are then more difficult: it is naturally preferable to make it possible for the airplane to land under normal conditions even if the entire system then requires revision by being disassembled and reassembled, and by changing the gas cartridge.

The linear actuator of the invention is thus particularly suitable for driving an aircraft landing gear leg, being quick and reliable in operation for the purpose of lowering the landing gear in an emergency.

The invention is not limited to the embodiment described above, but on the contrary covers any variant that uses equivalent means to reproduce the essential characteristics specified above.

I claim:

1. A linear actuator, in particular for driving an aircraft landing gear leg, the actuator comprising a main body with a screw that is prevented from moving axially and that is now constrained to rotate with a coaxial gear wheel that meshes with the outlet gear wheel of a driving motor and gear box assembly, and a nut that is secured to a sliding guide rod inside said main body, wherein the rotary connection between the screw and the coaxial gear wheel is provided by declutchable coupling means, which means is declutched in an emergency for the purpose of releasing the screw by associated trigger means whose operation requires very little energy, said coupling means being essentially a linear actuator, wherein the coupling means is essentially constituted by at least one radial finger carried by an extension of the screw on which the coaxial gear wheel is mounted to rotate, said radial finger having its radial inner end bearing against an associated cam and having its radially outer end cooperating with an associated recess in the coaxial gear wheel, said cam being axially displaceable between a coupled position and a decoupled position by triggering the trigger means, and said trigger means comprising a gas cartridge and a piston slidable in a blind bore of the main body and having a free end coupled to the associated cam in such a manner that triggering said trigger means causes axial displacement of said piston and of said cam under drive from gas released by said cartridge.

2. A linear actuator according to claim 1, wherein the coupling means includes a plurality of radial fingers angularly distributed around the axis of the screw, each of said radial fingers being urged by an associated spring against a common cam which is generally conical in shape and which is disposed coaxially with said screw.

3. A linear actuator according to claim 1, wherein the radially inner end of the (for each) radial finger is constituted by a ball assembled thereto.

4. A linear actuator according to claim 2, wherein the common cam includes an axial extension suitable for sliding telescopically in the screw.

5. A linear actuator according to claim 1, wherein the cartridge contains a powder that releases the propellant gas when ignited by explosive means.

6. A linear actuator according to claim 1, wherein the cartridge provides a store of gas from which the propellant gas is released via an associated valve or cock.

* * * * *